UNITED STATES PATENT OFFICE.

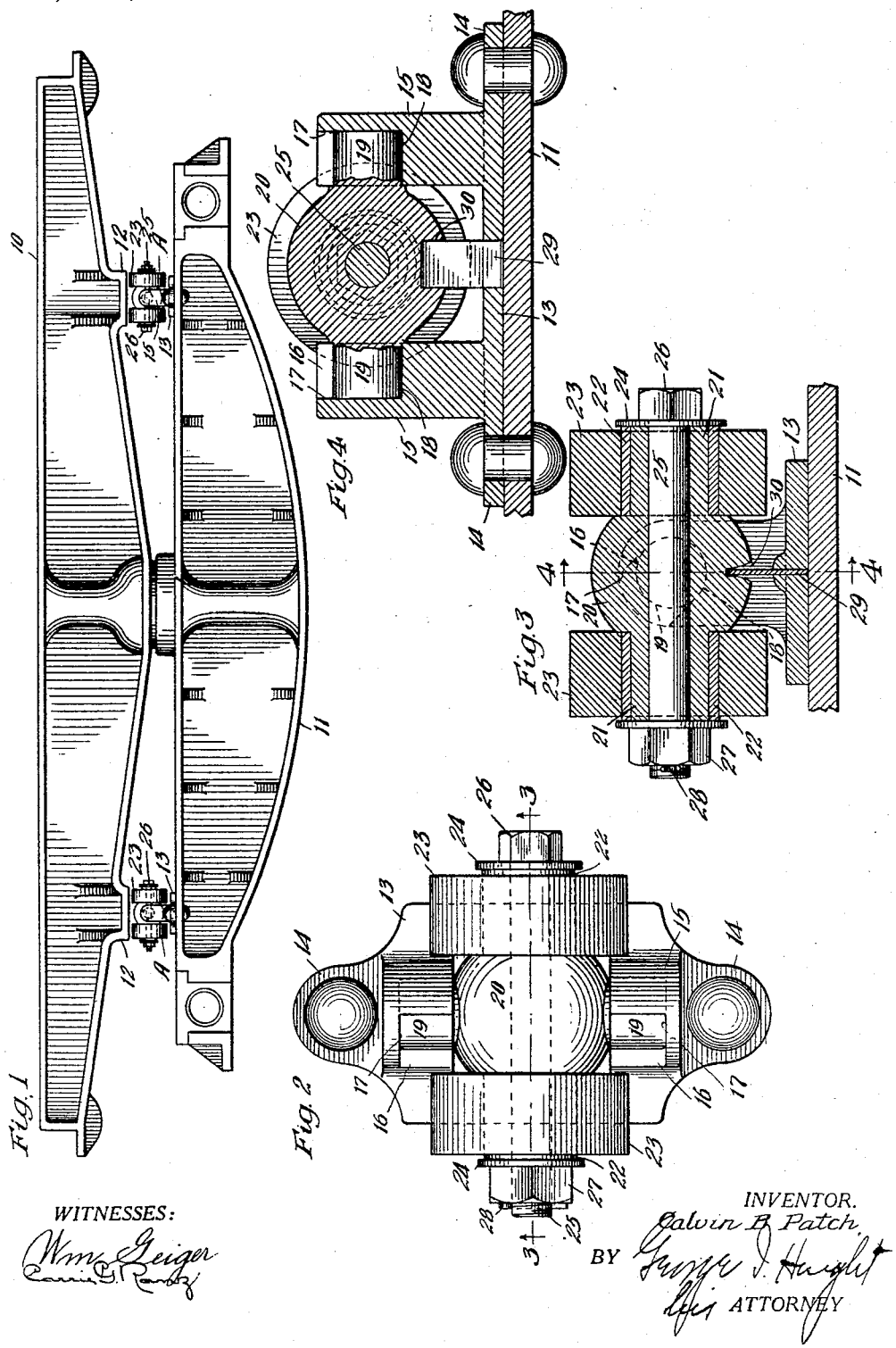

CALVIN B. PATCH, OF GLENELLYN, ILLINOIS, ASSIGNOR TO WILLIAM H. MINER, OF CHAZY, NEW YORK.

ROLLER SIDE BEARING FOR RAILWAY-CARS.

1,203,253.  Specification of Letters Patent.  Patented Oct. 31, 1916.

Application filed July 25, 1914. Serial No. 853,002.

*To all whom it may concern:*

Be it known that I, CALVIN B. PATCH, a citizen of the United States, residing at Glenellyn, in the county of Dupage and State of Illinois, have invented a certain new and useful Improvement in Roller Side Bearings for Railway-Cars, of which the following is a full, clear, concise, and exact description, reference being had to the accompanying drawings, forming a part of this specification.

This invention relates to improvements in roller side bearings for railway cars.

The object of the invention is to provide a rockably mounted roller side bearing for railway cars of simple, cheap and efficient construction.

In the drawing forming a part of this specification Figure 1 is a side elevation of the truck and body bolster of a car showing my improvements in connection therewith. Fig. 2 is a top plan view of the improved roller side bearing. Fig. 3 is a vertical sectional view taken substantially on the line 3—3 of Fig. 2 and Fig. 4 is a vertical sectional view taken substantially on the line 4—4 of Fig. 3.

In said drawing, 10 denotes the body bolster and 11 the truck bolster of a railway car which may be of any well known or desirable construction pivotally connected at the center in the usual manner. As shown, the body bolster is provided with integral thrust or bearing plates 12 and the truck bolster has secured thereto my improved roller bearing designated generally by the reference A.

Each bearing member A, as shown, preferably comprises a base plate or casting 13 having laterally extended flanges 14 by which the same is secured to the truck bolster by rivets or other suitable fastening devices. Near each end, the base casting is provided with integral, upwardly extending brackets 15 each of which is provided with an angularly disposed slot or recess 16 open at the top thereof as indicated at 17, the bottoms of said recesses 16 being curved as indicated at 18 to provide a bearing for trunnions 19 formed on the opposite sides of a cradle 20, said trunnions being preferably formed integrally with said cradle. As clearly shown in the drawing, the axis of the trunnions 19, 19 extends transversely of the truck bolster. Midway between the trunnions 19 and on opposite sides of the cradle, the latter is provided with oppositely extending hollow integral bearings 21 on each of which is detachably mounted a sleeve 22 the latter in turn supporting detachable antifriction rollers 23, the rollers and sleeves 22 being held in place by washers 24, 24 mounted on a bolt 25 the latter having a head 26 at one end thereof and a nut 27 at the other end, the nut being held in position by a cotter 28, it being understood that the bolt 25 extends entirely through the cradle 20 as shown most clearly in Fig. 3. Extending upwardly from the center of the base plate 13 is a leaf spring 29 the upper end of which engages in a flared notch 30 formed on the under side of the cradle 20.

In assembling my improved bearing member A, the cradle 20 is first placed in position with the trunnions 19, 19 in the inclined recesses 16 and at the same time the spring 29 is engaged in the flared notch 30. After the cradle has thus been placed in position, the sleeves 22 and rollers 23 are applied and the same prevented from falling off by the bolt and washers, previously described. In this connection it will be noted that there is a certain amount of clearance between the lower inner edges of the rollers 23 and the edges of the upstanding lugs or brackets 15, 15 whereby the cradle and rollers carried thereby are permitted sufficient oscillating or rocking movement to accommodate themselves to the positions of the bolsters. At the same time it will be noted that the cradle 20 can not be removed from the base casting so long as the rollers 23 are in position since the latter overlap the upstanding lugs or brackets 15, as clearly shown in Fig. 4, which prevents the trunnions 19 from being moved laterally or horizontally sufficiently for the same to be disengaged from the recesses 16, 16.

From the preceding description it will be seen that the roller bearing which I have provided is of relatively cheap construction; most of the parts may be made in the form of castings; the parts may be readily assembled and disassembled; and automatically operating means are provided for returning the rollers and cradle by which they are carried to normal position.

I am aware that numerous changes may be made in the details of construction and arrangements of parts and I do not wish to be confined to the structure herein described in detail.

I claim:—

1. In a side bearing for railway cars, the combination with a rockably mounted cradle having oppositely extending journals formed integrally therewith, of rollers detachably mounted on said journals.

2. In a side bearing for railway cars, the combination with a base casting adapted to be secured to a bolster, of a cradle rockably mounted on said casting about an axis extending transversely of the bolster, and automatically operating means for returning said cradle to normal position.

3. In a side bearing for railway cars, the combination with a base plate having bearings therein, of a cradle having laterally extended trunnions, the trunnions being removably mounted in said bearings, and rollers carried by said cradle, said rollers preventing disengagement of the cradle from the base plate.

4. In a side bearing for railway cars, the combination with a base plate, of a cradle rockably mounted on said base plate, a pair of axially alined rollers carried by said cradle, and a spring extending between said plate and the cradle for returning the latter to normal position.

5. In a side bearing for railway cars, the combination with a base plate having spaced lugs extending therefrom, said lugs having recesses inclined relatively to the base casting and formed on the inner sides of said lugs, each of said recesses being open at one end and curved at the other end to thereby form bearings, of a cradle having oppositely extending trunnions, and anti-friction means carried by said cradle, said trunnions being inserted into said recesses before said means are attached to the cradle, said means, when in place, engaging said lugs and thereby preventing accidental disengagement of the cradle from the base plate.

6. In a side bearing for railway cars, the combination with a base plate having spaced, upstanding lugs provided with inclined recesses on the inner sides thereof, said recesses being open at their upper ends and curved at the lower ends to thereby provide bearings, of a cradle having diametrically disposed trunnions insertible in said recesses through the open ends thereof and rollers carried by said cradle on the opposite sides thereof, said rollers preventing the removal of the cradle trunnions from said recesses.

7. In a side bearing for railway cars, the combination with a base plate, of a cradle, means for rockably connecting the cradle to the base plate, said means including recesses formed on one of said members and lateral projections extending into said recesses formed on the other of said members, alined rollers carried by said cradle, and spring means for centering said cradle.

CALVIN B. PATCH.

Witnesses:
CARRIE G. RANZ,
ARLINE R. ARNOLD.

Copies of this patent may be obtained for five cents each, by addressing the "Commissioner of Patents, Washington, D. C."